(12) United States Patent
Jessen

(10) Patent No.: US 6,659,190 B2
(45) Date of Patent: Dec. 9, 2003

(54) AERATOR SULKY

(76) Inventor: Thomas F. Jessen, 855 Harrison Blvd., Valparaiso, Porter County, IN (US) 46383

(*) Notice: Subject to any disclaimer, the term of this patent is extended or adjusted under 35 U.S.C. 154(b) by 0 days.

(21) Appl. No.: 10/249,620

(22) Filed: Apr. 24, 2003

(65) Prior Publication Data

US 2003/0201106 A1 Oct. 30, 2003

Related U.S. Application Data

(60) Provisional application No. 60/375,141, filed on Apr. 24, 2002.

(51) Int. Cl.[7] ............................................. A01B 45/02
(52) U.S. Cl. ..................... 172/21; 172/329; 172/332; 172/343
(58) Field of Search .................. 172/21, 22, 37, 172/41, 329, 332, 343

(56) References Cited

U.S. PATENT DOCUMENTS

| | | | | |
|---|---|---|---|---|
| 4,336,760 A | * | 6/1982 | Cohen et al. ............... 111/131 |
| 4,424,868 A | * | 1/1984 | Staniforth et al. ............ 172/21 |
| 4,550,783 A | * | 11/1985 | Hansen ........................ 172/21 |
| 4,867,244 A | * | 9/1989 | Cozine et al. ................ 172/22 |
| 5,020,602 A | * | 6/1991 | Dellinger .................... 172/21 |
| 5,398,769 A | * | 3/1995 | Staples ....................... 172/21 |
| 5,450,910 A | * | 9/1995 | Strzyzewski ................ 172/438 |
| 5,579,847 A | * | 12/1996 | Postema ....................... 172/22 |
| 5,586,604 A | * | 12/1996 | Postema ....................... 172/21 |
| 5,623,996 A | * | 4/1997 | Postema ...................... 172/118 |
| 5,690,179 A | * | 11/1997 | Dickson ....................... 172/21 |
| 5,765,645 A | * | 6/1998 | Postema ....................... 172/21 |
| 6,102,129 A | * | 8/2000 | Classen ....................... 172/21 |
| 6,179,061 B1 | * | 1/2001 | Fiore .......................... 172/21 |
| 6,241,025 B1 | * | 6/2001 | Myers et al. .................. 172/21 |
| 6,415,872 B2 | * | 7/2002 | Myers et al. .................. 172/21 |
| 6,457,903 B1 | * | 10/2002 | Dufty ......................... 404/122 |
| 6,460,624 B1 | * | 10/2002 | Dufty .......................... 172/21 |

* cited by examiner

*Primary Examiner*—Robert E. Pezzuto
*Assistant Examiner*—Alexandra K. Pechhold
(74) *Attorney, Agent, or Firm*—Gary M. Hartman; Domenica N. S. Hartman; Hartman & Hartman, P.C.

(57) ABSTRACT

A lawn aerator sulky adapted for attachment to a selflawn vehicle, such as a walk-behind mower or fertilizer spreader. The sulky includes a frame supported with wheels, a first platform on which an operator can stand and ride while not aerating, and a second platform carrying one or more aerator tine assemblies on its underside. The second platform and tine assemblies are moveable by the operator selectively transferring his/her weight to position the tine assemblies in a ground-engaged or ground-disengaged position. The sulky includes a device to support the second platform and its tine assemblies in the disengaged position when the operator steps off the platform, and a latching device to hold the second platform and its tine assemblies in the engaged position when the operator steps off the second platform.

22 Claims, 4 Drawing Sheets

AERATOR SULKY

CROSS REFERENCE TO RELATED APPLICATIONS

This application claims the benefit of U.S. Provisional Application No. 60/375,141, filed Apr. 24, 2002.

BACKGROUND OF INVENTION

1. Field of the Invention

The present invention generally relates to apparatuses for aerating lawns. More particularly, this invention relates to an aerator sulky that is configured for towing behind a selflawn care vehicle, to permit the operator to selectively stand on or walk behind the sulky, and to enable the operator to selectively vary and control the amount of ground engagement of the aerator.

2. Description of the Related Art

Professional lawn maintenance often includes the application of dry and liquid materials including seed, fertilizer, and pesticides, as well as mechanical processes including mowing and aerating. Various vehicles have been developed and are currently in use to accomplish one or more of these common lawn care tasks. For example, commonly-owned U.S. Pat. No. 6,336,600 to Jessen (incorporated herein by reference) discloses a selfcombination fertilizer spreader and sprayer that permits the operator to selectively walk behind or stand on a sulky while traveling at different ground speeds, at least one of which is beyond the maximum comfortable walking speed of a person.

Aeration or aerification is the process of more or less vertically penetrating the thatch and soil with reciprocating or revolving tines to remove thatch and soil plugs. Aerification is very beneficial to the turf in reducing diseases and thatch buildup, relieving soil compaction to increase the root system, and allowing air and water to penetrate into the soil. However, the act of poking thousands of holes in hard soil and removing some of the soil and thatch (particularly in heavy clay soils under drought conditions) is a time-consuming and physically demanding process. It is further complicated by the fact that lawn sizes vary from a few hundred square feet in area up to many acres in size. Consequently, the size, weight, and manueverablity of machinery used to perform these operations are important considerations, especially since heavy machines can compact the soil, further increasing the need for aeration to relieve the compaction. Another burdensome complication is the storage, cost, and maintenance of multiple pieces of equipment, making it highly desirable to have a single machine perform multiple tasks.

Generally, large heavy equipment is required to put enough downward force on aerator tines to penetrate hard soil conditions. U.S. Pat. No. 3,995,564 to Picardat and U.S. Pat. No. 4,424,868 to Staniforth disclose selfaerators on which the operator sits. The disclosed aerators require complicated and costly hydraulically-operated ram systems to transfer enough weight to the aerator tines to penetrate thatch and soil. The aerators are large and heavy, which make operation on smaller lawns with gates, etc., impractical. Furthermore, the aerators disclosed by Picardat and Staniforth are stand-alone machines, and are not adapted for towing behind conventional lawn care vehicles. Even if so modified, these aerators are not adapted for circumstances in which the operator of the unit prefers or is required to walk behind the unit.

An aerator adapted to be retrofitted to an existing self-mower is shown in U.S. Pat. No. 6,241,025 to Meyers et al. The disclosed aerator assembly is pivotably mounted to a mower so that the assembly can pivot from a ground engaged position to a disengaged position by a mechanical or electrical actuator. However, Meyers et al. make no provision to permit the operator to selectively stand on or walk behind the aerator and operate the vehicle as originally intended (e.g., mowing or fertilizing). Furthermore, the disclosed aerator is not configured to allow the operator to selectively vary and control the amount of ground engagement of the aerator tines.

In attempts to overcome the problems associated with operating on small lawns, selfwalk-behind aerators have been proposed, as typified by U.S. Pat. No. 6,102,129 to Classen, U.S. Pat. No. 4,336,760 to Cohen et al., 5,398,769 to Staples, and 4,550,783 to Hansen. While these can be viewed as more compact, lightweight, and maneuverable than other aerating machines, the aerators disclosed in these patents do not provide a place for the operator to stand and ride to reduce the fatigue of walking. Consequently these aerators are not designed to be operated at a speed faster than a person can comfortably walk, which renders the aerators too slow for use on larger properties.

U.S. Pat. No. 6,179,061 to Fiore discloses an aerator sulky that uses the weight of the operator to push the tines into the ground. The aerator is configured so that the operator is required to sit down and stand up to engage and disengage, respectively, the aerator tines. By it's very nature, aerating hard soils is a jarring and violent process, especially when the tines encounter a subterranean stone or tree root. When sitting, this jarring is transferred directly to the spine, increasing the potential for back injury. Moreover, there is no provision to ensure that the weight necessary for proper tine penetration will be applied.

To provide the weight necessary for proper tine penetration, some aeration equipment are adapted to permit extra weight to be added externally, as disclosed in U.S. Pat. No. 5,020,602 to Dellinger, U.S. Pat. No. 5,579,847 and U.S. Pat. No. 5,623,996 to Postema, and U.S. Pat. No. 5,450,910 to Strzyzewski, or internally within a drum as in U.S. Pat. No. 5,690,179 to Dickson. While effective for the intended purpose, this approach significantly increases the weight of the machine during transport between jobs, requiring the use of heavier and more costly trucks and trailers. To overcome this problem, U.S. Pat. Nos. 5,765,645, 5,579, 847, 5,586,604, and 5,623,996 to Postema disclose specially shaped tines that are intended to reduce the weight required for tine penetration. Nonetheless, U.S. Pat. Nos. 5,579,847, 5,523,996, and 5,586,604 also disclose either extra weights incorporated into the aerator assemblies or facilities for adding extra weight. Furthermore, no provisions are made to permit the operator to selectively stand on or walk behind the aerator and operate the vehicle as originally intended (i.e., mowing or fertilizing).

From the above, it can be seen that further improvements in lawn and garden aerators would be desirable. Such improvements would preferably enable the aerating apparatus to be towed by a conventional lawn care vehicle, such as a self-propelled mower or spreader, while permitting the operator to ride or walk behind the vehicle while the vehicle is operated as originally intended (i.e., mowing or fertilizing). It would be further desirable if such an apparatus permitted the operator to stand on or walk behind the sulky while aerating at different forward speeds, including at least one speed that is faster than a comfortable walking pace. It would also be desirable if such an apparatus was configured to allow the operator to selectively vary and control the degree to which the aerating splines engage the ground without resorting to the use of extraneous weights, and without the use of complicated and expensive hydraulic and electrical actuators.

SUMMARY OF INVENTION

The present invention provides an aerator sulky that can be towed by a selflawn vehicle, such as a mower or fertilizer spreader. The sulky is particularly suitable for attaching to a self-propelled lawn vehicle that can operate at a relatively high speed, during which time the operator rides the sulky, and at a relatively low speed when the operator is able to walk behind the sulky.

The aerator sulky of this invention generally includes a frame having a front portion and oppositelyside portions, wheels mounted to support the frame, and means for pivotably connecting the sulky to a towing vehicle. A first platform is mounted to the frame for supporting an operator of the sulky while in a standing position. The first platform is located on the frame to enable the operator to step forward onto the first platform to ride the sulky and to step rearward off of the first platform to walk behind the sulky. A second platform is pivotably attached to the frame and configured to enable the operator to stand thereon while performing an aerating operation with the sulky. The second platform is further configured to enable the operator to step forward onto the second platform to ride the sulky, step rearward off of the second platform to walk behind the sulky, and step to and from the first and second platforms. The second platform is pivotably attached to the frame so as to enable the operator to shift his/her weight in order to selectively raise and lower the second platform between a ground-engaged position and a ground-disengaged position. At least one aerator tine assembly is rotatably mounted to and beneath the second platform so as to engage the surface beneath the sulky when the second platform is in the ground-engaged position and to be out of contact with the surface beneath the sulky when the second platform is in the ground-disengaged position. The sulky further comprises means for affecting motion of the second platform between the ground-engaged and ground-disengaged positions thereof.

In view of the above, it can be appreciated that the aerator sulky of this invention is configured to enable an operator to selectively vary and control the position of the aerator tines by using his/her weight to force the tines into the soil without complicated and expensive operating devices and without installing additional weight. In a preferred embodiment, the sulky is suitable for attachment to a self-propelled lawn vehicle, such as a mower or spreader, and can be used to perform aeration while the operator is standing on the sulky and traveling at a relatively high speed, as well as perform aeration while the operator is walking behind the sulky at a relatively low speed. The sulky also permits the lawn vehicle to be operated at any speed without performing an aerating operation.

Other objects and advantages of this invention will be better appreciated from the following detailed description.

DETAILED DESCRIPTION

Figure 1:
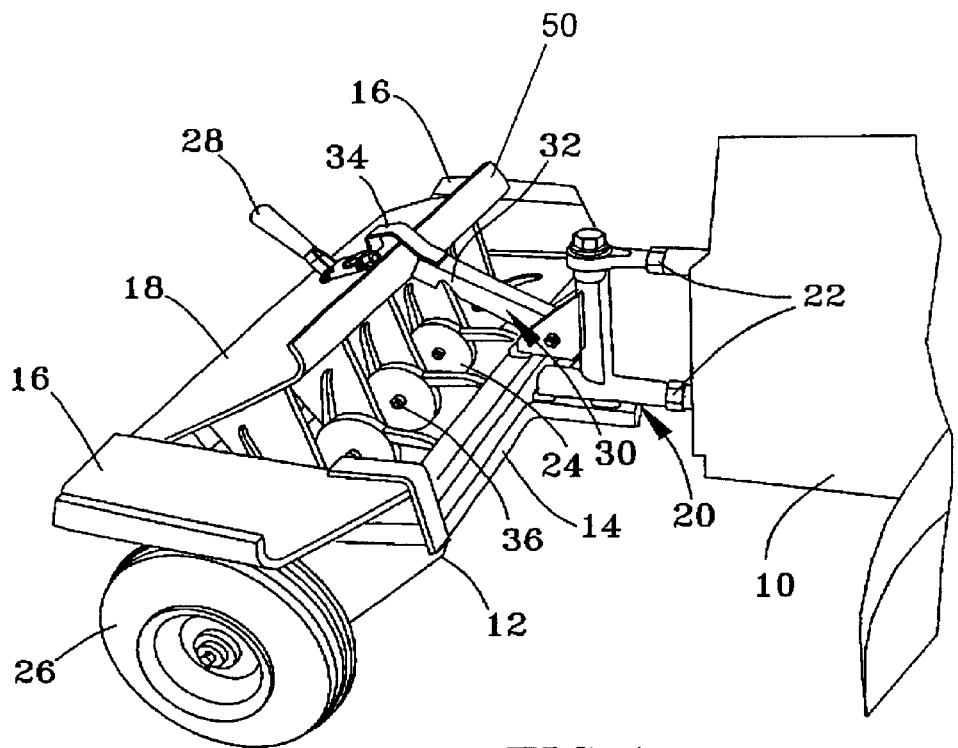
FIG. 1 shows an aerator sulky attached to a selfspreader in accordance with a preferred embodiment of this invention.

FIG. 1 shows an aerator sulky 12 of this invention coupled to a selfvehicle 10 of a type described in U.S. Pat. No. 6,336,600 to Jessen, so as not to require further elaboration. According to an aspect of this invention, the vehicle 10 is preferably a spreader or mower that can be selectively operated at a relatively high speed when an operator of the vehicle 10 is riding on the sulky 12, and at a relatively low speed that permits the operator to walk behind the sulky 12 at a comfortable pace. The aerator sulky 12 is shown in accordance with a preferred embodiment of this invention as being attached to the vehicle 10 with a tongue 20 and an articulating joint mechanism 22, such as of the type disclosed in Jessen.

The sulky 12 is depicted as comprising a frame 14 supported by a pair of wheels 26. The frame 14 can be formed of any suitable material, preferably metal for strength, rigidity and ease of manufacture. The frame 14 is equipped with a platform that is in the form of a pair of lateral footrests 16 upon which an operator may stand while riding the aerator sulky 12 behind the vehicle 10. The frame 14 further has a pivotable platform 18 disposed between the footrests 16 and adapted to support the operator while standing on and riding the sulky 12. The footrests 16 and platform 18 are configured and mounted to the frame 14 to enable the operator to step forward onto the footrests 16 or platform 18 to ride the sulky 12, to step rearward off the footrests 16 or platform 18 to walk behind the sulky 12, and to step between the footrests 16 and the platform 18. A suitable number of aerator tine assemblies 24 are mounted to the underside of the platform 18 for engagement with the ground beneath the sulky 12. The tine assemblies 24 may carry any number of radially extending tines 48, which may be of any suitable design, e.g., straight, curved, open spoon, hollow, etc.

Figure 2:
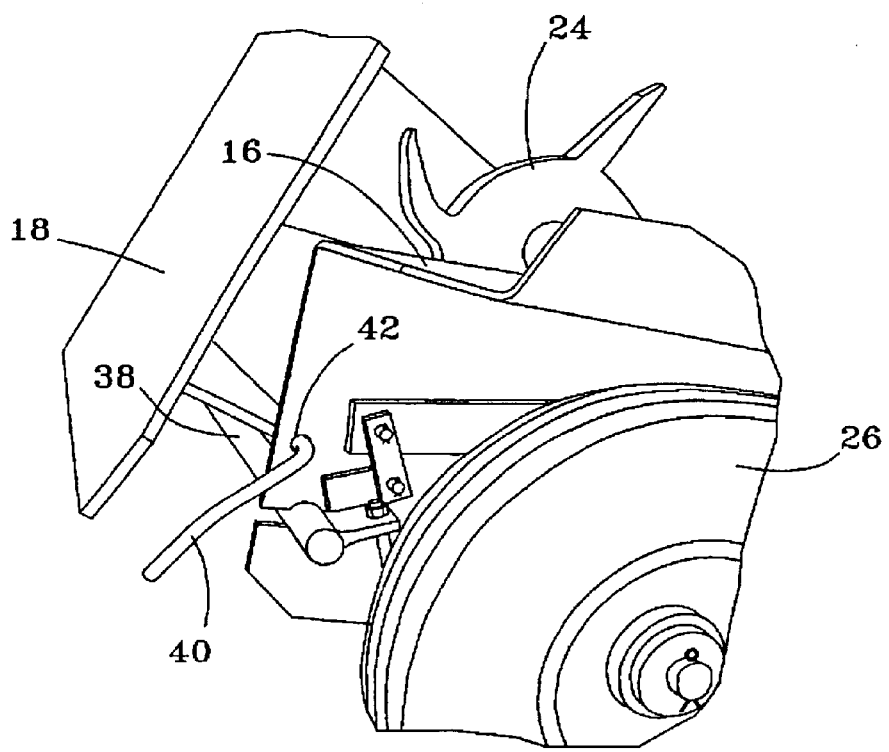
FIG. 2 is a view of the aerator sulky of FIG. 1 showing a platform adapted to permit an operator of the sulky to ride on the sulky and apply a downward force, thereby causing aerator tine assemblies mounted to the underside of the platform to engage the ground beneath the sulky.
Figure 3:
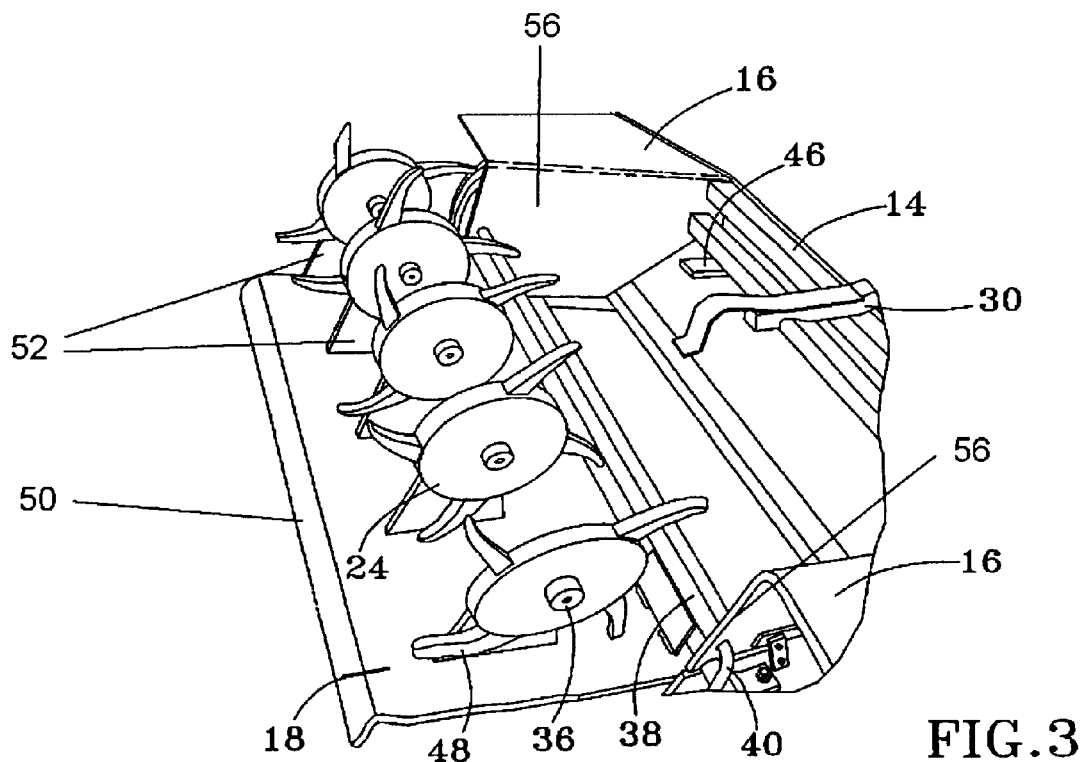
FIG. 3 shows the aerator sulky of FIG. 1 with the platform rotated fully rearward to expose the aerator tine assemblies.

As can be seen in FIG. 2, the platform 18 is pivotably mounted to the frame 14 by way of a pivot pin 40 that passes through pivot holes 42 (one of which is visible in FIG. 2) located in opposite side frame members 56 of the frame 14 and through a hinge knuckle 38 mounted to the platform 18. FIG. 3 shows the platform 18 fully inverted as a result of being rotated completely rearward to assume a position that facilitates cleaning and maintenance of the tine assemblies 24. The aerator tine assemblies 24 are shown in FIG. 3 as being rotatably mounted with axle bolts 36 to carriage plates 52 attached to the underside of the platform 18. Each axle bolt 36 preferably passes through a center bearing (not shown) located in the hub of its corresponding aerator tine assembly 24. If so desired, the aerator sulky 12 can be equipped with a braking system (not shown) that can be operated with a brake pedal mounted to the one of the footrests 16 or platform 18 for operating a braking assembly capable of stopping the rotation of the wheels 26.

Figure 4:
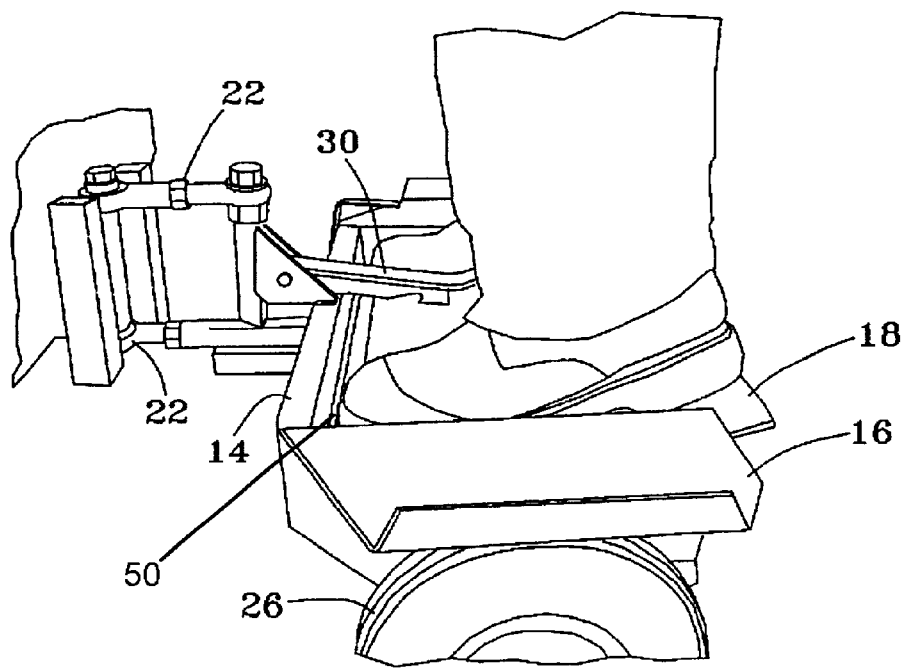
FIG. 4 shows the platform in a ground engaged position as a result of an operator standing on the platform so as to apply a downward force to the aerator tine assemblies.
Figure 8:
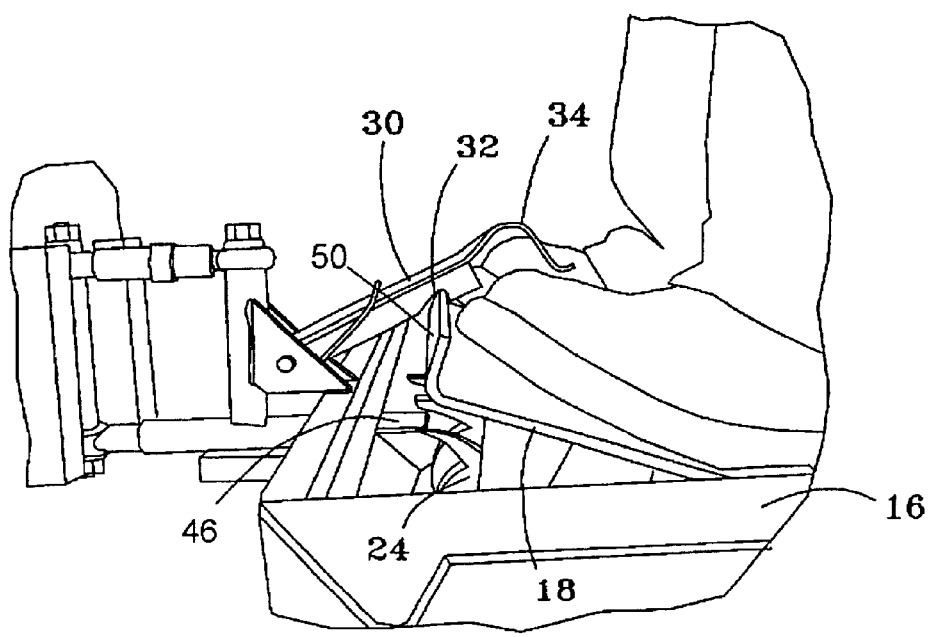
FIG. 8 shows the platform raised and held in a disengaged position by the operator shifting his/her weight to the rear of the platform.

As a result of the above-described arrangement in which the platform 18 is pivotably mounted to the frame 14, an operator standing on the platform 18 is able to selectively rotate the platform 18 by selectively shifting his/her weight to the front or rear of the platform 18, thereby lowering or raising, respectively, the front edge 50 of the platform 18. The former is depicted in FIG. 4, while the latter is depicted in FIG. 8. As evident from FIGS. 1, 2 and 5, rotation of the platform 18 rearward causes the tines 48 to be raised out of engagement with the ground beneath the aerator sulky 12. Similarly, the operator is also able to shift his/her weight toward the front edge 50 of the platform 18, thereby causing the front edge 50 to rotate downward and engage the tines 48 with the ground beneath the sulky 12. In this position, the tines 48 are urged into engagement with the ground beneath the sulky 12 by the weight of the operator. An operator is thus able to control when and to what extent the tines 48 engage the ground, such that the operator can control the degree to which the ground is aerated.

Figure 5:
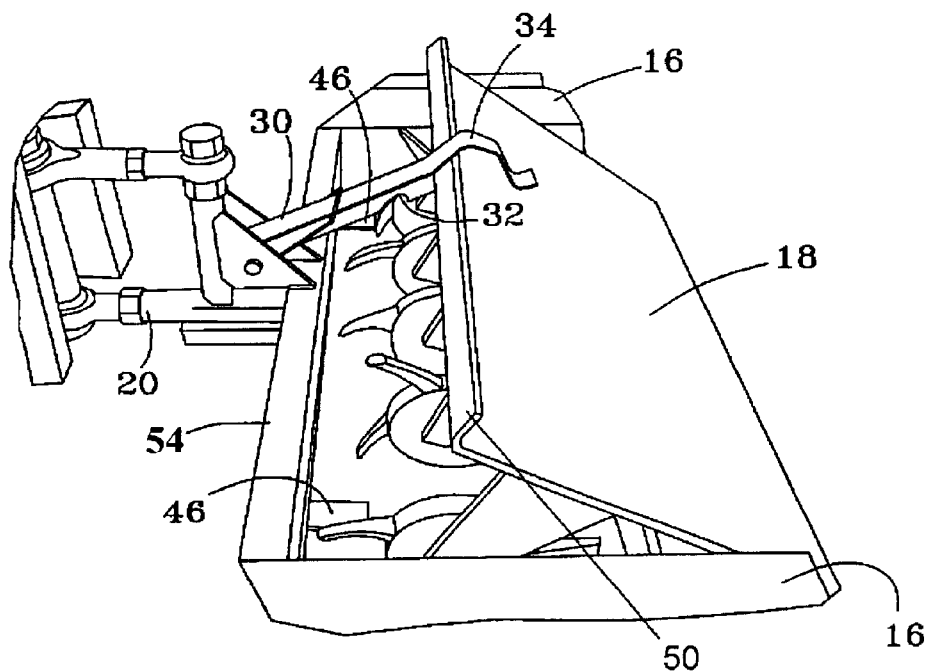
FIG. 5 shows the platform secured in a raised, ground-disengaged position for transport.

With further reference to FIG. 5, the frame 14 is preferably equipped with stops 46 that limit the downward travel of the front edge 50 of the platform 18, thereby establishing a maximum depth of penetration for the tines 48. The sulky 12 is also equipped with a platform controlling bracket 30 that is pivotably mounted to a front frame member 54 of the frame 14. The bracket 30 is formed to have a first catch 32 that is able to limit the upward travel of the platform 18 as the operator shifts his/her weight rearward to lift the tines 48 out of engagement with the ground. The controlling bracket 30 is also formed to have a second catch 34 (generally in the form of a hook) located and configured to support the front edge 50 of the platform 18 at a raised position in which the tines 48 are not engaged with the ground. This ground-disengaged position of the platform 18 is useful when the operator is transporting the sulky 12 or otherwise when the aerating operation is not desired. As is evident from FIG. 8, the bracket 30 is located and configured to be operable with the operator's foot.

Figure 6:
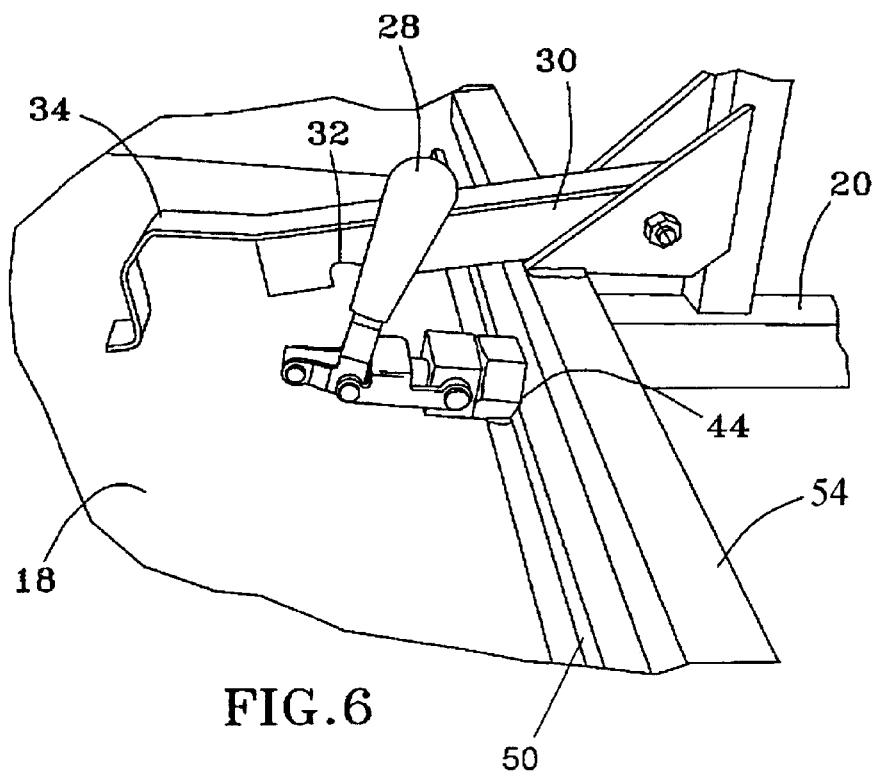
FIGS. 6 and 7 show a platform latching mechanism in unlatched and latched positions, respectively.
Figure 7:
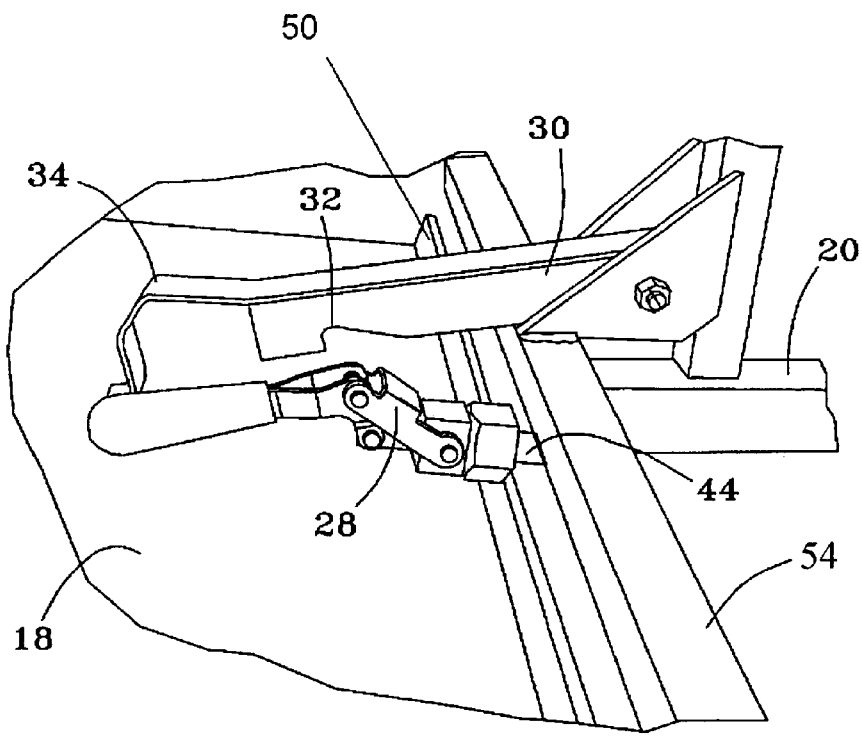

FIGS. 6 and 7 show a cam latching mechanism 28 of a type known in the art. The latching mechanism 28 has a pin 44 that is depicted in FIG. 6 as being disengaged from the front frame member 54 of the frame 14, thereby allowing the platform 18 to rotate freely, including raised to the ground-disengaged position. FIG. 7 shows the latching mechanism 28 with its pin 44 extended to engage the front frame member 54, thereby securing the platform 18 in a ground-engaged position in which the tines 48 are engaged with the ground beneath the sulky 12. With the platform 18 latched in this manner, the operator is free to step off of the platform 18, e.g., onto the footrests 16 or onto the ground behind the sulky 12, without interrupting the aeration operation.

While the invention has been described in terms of a particular embodiment, it is apparent that one skilled in the art could adopt other forms. Accordingly, the scope of the invention is to be limited only by the following claims.

What is claimed is:

1. An aerator sulky comprising:
   a frame having a front portion and side portions that are oppositely disposed from each other portions;
   wheels mounted to support the frame above a surface;
   means for pivotably connecting the sulky to a towing vehicle;
   a first platform mounted to the frame for supporting an operator of the sulky while in a standing position, the first platform being located on the frame to enable the operator to step forward onto the first platform to ride the sulky and to step rearward off of the first platform to walk behind the sulky;
   a second platform pivotally attached to the frame and configured to enable the operator to stand thereon while performing an aerating operation with the sulky, to enable the operator to step forward onto the second platform to ride the sulky, to enable the operator to step rearward off of the second platform to walk behind the sulky, and to step to and from the first and second platforms, the second platform being pivotally attached to the frame so as to enable the operator to shift his/her weight in order to selectively raise and lower the second platform between a ground-engaged position and a ground-disengaged position thereof;
   at least one aerator tine assembly rotatably mounted to and beneath the second platform so as to engage the surface beneath the sulky when the second platform is in the ground-engaged position and to be out of contact with the surface beneath the sulky when the second platform is in the ground-disengaged position; and
   means for affecting motion of the second platform between the ground-engaged and ground-disengaged positions thereof.

2. The aerator sulky according to claim 1, wherein the motion-affecting means comprises means for selectively latching the second platform in the ground-engaged position to enable the operator to step off the second platform without pivoting the second platform while the sulky performs the aerating operation.

3. The aerator sulky according to claim 1, wherein the motion-affecting means comprises means for stopping motion of the second platform at the ground-engaged position to limit penetration of the aerator tine assembly into the surface beneath the sulky during the aerating operation.

4. The aerator sulky according to claim 1, wherein the motion-affecting means comprises means for selectively latching the second platform in the ground-disengaged position to enable the operator to step on and off the second platform without pivoting the second platform.

5. The aerator sulky according to claim 1, wherein the motion-affecting means comprises means for stopping motion of the second platform when pivoting to the ground-disengaged position.

6. The aerator sulky according to claim 1, wherein the sulky is connected to the towing vehicle.

7. The aerator sulky according, to claim 6, wherein the towing vehicle is a self-propelled vehicle selected from the group consisting of mowers and fertilizer spreaders.

8. The aerator sulky according to claim 1, wherein the pivotable connecting means comprises an articulating joint.

9. The aerator sulky according to claim 1, wherein the frame and the second platform have adjacent rearward portions, the rearward portion of the second platform being pivotably coupled to the rearward portion of the frame.

10. The aerator sulky according to claim 1, wherein the first platform comprises oppositely-disposed footrests disposed at the side portions that are oppositely disposed from each other portions of the frame.

11. The aerator sulky according to claim 10, wherein the second platform is between the oppositely-disposed footrests of the first platform.

12. The aerator sulky according to claim 1, wherein the second platform is pivotally attached to the frame so as to enable the second platform to be inverted so that the at least one aerator tine assembly is above the second platform.

13. An aerator apparatus comprising a self-propelled vehicle and a sulky coupled to the self-propelled vehicle, the sulky comprising:

a frame having a front member and side portions that are oppositely disposed from each other members; wheels mounted to support the frame above a surface;

means for pivotably connecting the sulky to the self-propelled vehicle;

a first platform fixedly mounted to the frame for supporting an operator of the aerator apparatus while in a standing position, the first platform being located on the frame to enable the operator to step forward onto the first platform to ride the sulky and to step rearward off of the first platform to walk behind the sulky, the first platform being fixedly mounted to the frame so as not to move when the operator steps onto and off of the first platform;

a second platform having a rear portion pivotably attached to the frame so as to enable the operator to shift his/her weight rearward and forward in order to selectively raise and lower, respectively, a front edge of the second platform between a ground-engaged position and a ground-disengaged position of the second platform, the second platform being configured to enable the operator to stand thereon while performing an aerating operation with the sulky, to enable the operator to step forward onto the second platform to ride the sulky, to enable the operator to step rearward off of the second platform to walk behind the sulky, and to step to and from the first and second platforms;

multiple aerator tine assemblies rotatably mounted to and beneath the second platform so as to engage the surface beneath the sulky when the second platform is in the ground-engaged position and to be out of contact with the surface beneath the sulky when the second platform is in the ground-disengaged position;

means for selectively latching the second platform in the ground-engaged position to enable the operator to step off the second platform without pivoting the second platform while the sulky performs an aerating operation; and means for selectively latching the second platform in the ground-disengaged position to enable the operator to step on and off the second platform without pivoting the second platform.

14. The aerator apparatus according to claim 13, wherein the self-propelled vehicle is selected from the group consisting of mowers and fertilizer spreaders.

15. The aerator apparatus according to claim 13, wherein the first platform comprises oppositely-disposed footrests disposed at the side portions that are oppositely disposed from each other portions of the frame.

16. The aerator apparatus according to claim 15, wherein the second platform is between the oppositely-disposed footrests of the first platform.

17. The aerator apparatus according to claim 13, wherein the second platform is pivotably attached to the frame so as to enable the second platform to be inverted so that the aerator tine assemblies are above the second platform.

18. The aerator apparatus according to claim 13, wherein the means for selectively latching the second platform in the ground-engaged position comprises a pin supported by the second platform and selectively engagable with the frame.

19. The aerator apparatus according to claim 13, wherein means for selectively latching the second platform in the ground-disengaged position comprises a bracket supported by the frame and selectively engagable with the second platform.

20. The aerator apparatus according to claim 13, wherein self-propelled vehicle has at least two different ground speeds, at least one of the at least two different ground speeds being sufficiently low to allow the operator to walk behind the sulky, at least one of the at least two different ground speeds being too high to permit the operator to walk behind the sulky.

21. The aerator apparatus according to claim 13, further comprising means for stopping motion of the second platform at the ground-engaged position to limit penetration of the aerator tine assemblies into the surface beneath the sulky during the aerating operation.

22. The aerator apparatus according to claim 13, further comprising means for stopping motion of the second platform when pivoting to the ground-disengaged position.

* * * * *